United States Patent [19]
Wolff

[11] Patent Number: 5,946,050
[45] Date of Patent: Aug. 31, 1999

| | | | |
|---|---|---|---|
| [54] | KEYWORD LISTENING DEVICE | | |
| [75] | Inventor: | Robert M. Wolff, Fremont, Calif. | |
| [73] | Assignee: | Samsung Electronics Co., Ltd., Kyungki-do, Rep. of Korea | |
| [21] | Appl. No.: | 08/726,440 | |
| [22] | Filed: | Oct. 4, 1996 | |
| [51] | Int. Cl.⁶ | ................................. H04N 5/54 | |
| [52] | U.S. Cl. | .................. 348/553; 348/553; 348/555; 348/462; 348/474; 386/46; 386/96; 386/83; 386/39; 704/270; 704/275; 369/6; 369/7; 360/7 | |
| [58] | Field of Search | ................. 348/553, 555, 348/556, 558, 5.5, 460, 462, 465, 474, 2, 907, 485, 15, 1, 17; 386/46, 83, 39, 96; 360/7; 369/6, 7; 704/270, 275 | |

[56] References Cited

U.S. PATENT DOCUMENTS

| | | | |
|---|---|---|---|
| 4,305,101 | 12/1981 | Yarbrough et al. | 386/96 |
| 5,345,430 | 9/1994 | Moe | 369/7 |
| 5,448,534 | 9/1995 | Okada | 369/6 |
| 5,633,837 | 5/1997 | Gantt | 369/6 |

*Primary Examiner*—John K. Peng
*Assistant Examiner*—Paulos M. Natnael
*Attorney, Agent, or Firm*—Kenneth L. Sherman, Esq.; Sherman & Sherman

[57] ABSTRACT

A method and arrangement for monitoring the audio portion of a broadcast signal includes a keyword listening device. A relatively limited set of keywords are stored in a memory and the keyword listening device monitors the broadcast signal for any of these keywords. Upon recognition of any one or more of the keywords, the broadcast audio signal is recorded for a period of time and then fully analyzed. After analysis, and in dependence upon the recorded and analyzed broadcast audio signal, a number of different functions, such as connection to an external network at a specified address, or control of a video cassette recorder, may be performed.

21 Claims, 4 Drawing Sheets

KEYWORD LISTENING DEVICE

FIELD OF THE INVENTION

The present invention is related to the field of voice recognition, and more particularly, to the controlling of devices in response to the recognition of specified sounds.

BACKGROUND OF THE INVENTION

There is an increasing desire to make certain consumer level devices, such as televisions, be more interactive with a user than in the past. One of the ways in which interactivity may be achieved is through connection of the television set to outside networks, such as the Internet. Television viewers are, even today, frequently presented during their viewing with Internet addresses where they may find more information related to the programming which they are currently viewing. With the state of current technology, a viewer that desires to access information from this Internet address would need to remember or jot down the address, and then access it through the Internet via a personal computer or other processing device.

Initiatives have been proposed to facilitate the implanting or insertion of relatively small amounts of universal resource locator-type data in a broadcast signal. Universal resource locators (URLs) are essentially Internet addresses which provide simple access to relevant Internet resources. Such implanted addresses could then be used to automatically connect a user to the site on the external network at the specified address.

The initiatives for inserting URL-type data in a broadcast signal propose for the data to be generally stored in the area of a vertical blanking interval in the broadcast signal. The URL data could then be retrieved from the vertical blanking interval by a consumer-level device or the television. However, a problem with this type of proposal is the large investment it would require on the part of the broadcasters, advertisers and cable companies. This investment would involve changing the existing content of programs or commercials to insert such data into the stream. There would also be the investment required by a consumer for a hardware device to decode the data which has been implanted in the vertical blanking interval.

SUMMARY OF THE INVENTION

There is a need for an apparatus and a method for identifying keywords in a broadcast and providing a user with a functional control of a device in response to the broadcasting of a keyword, without requiring a large investment on the part of broadcasters, advertisers and cable companies.

This and other needs are met by certain embodiments of the present invention which provide an arrangement comprising a memory containing stored sound representations, an audio signal monitoring device that monitors a broadcast audio signal for the presence of the stored sound representations in the broadcast audio signal, and a processor that is responsive to detection of the stored sound representations in the broadcast audio signal by the audio signal monitoring device to perform a control function.

In certain embodiments, the stored sound representations are "keywords", the presence of which indicates that other information of interest may be present in the broadcast audio signal. In certain embodiments, therefore, the control function includes recording the broadcast audio signal for a period of time and analyzing this recorded broadcast audio signal after a keyword is detected.

This arrangement has the advantage of allowing for the monitoring of only a limited number of keywords in a broadcast audio signal, therefore requiring a relatively low amount of processing speed and power in order to detect the limited set of keywords. A circular buffer continuously records the broadcast audio signal during operation. It is only after one of the keywords is detected that the recording is continued and therefore performed for a longer period of time. The voice recognition software then performs a full analysis of the recorded broadcast audio signal. Since a recording will have been thereby captured with the broadcast audio signal just before and just after the keyword, the important information surrounding the keyword will most probably be contained in the recorded sound clip.

In certain embodiments of the invention, once the broadcast audio signal is analyzed, means are provided for generating a universal resource locator as a function of the analyzed recorded broadcast audio signal. A port to an external network is provided as well as means for establishing a connection over the external network to an external network node at an address specified by the universal resource locator. This aspect of the invention allows a viewer to very easily connect to an Internet or web site that is mentioned on a broadcast. Also, since voice recognition software is used to detect the presence of keywords, such as those related to the Internet, broadcasters do not have to make relatively large investments in equipment to insert this data into the vertical blanking interval of the broadcast signal.

Certain embodiments of the present invention include a video and audio broadcast signal recorder, such as a video cassette recorder, that is responsive to the analyzed recorded broadcast signal. In such a system, a consumer may cause a video cassette recorder to automatically record broadcast signals of program content in which the user is particularly interested. For example, if a consumer is particularly interested in a certain sports team, the consumer may cause the system to monitor the broadcast audio signals of news programs to detect when the name of his sports team is mentioned. When the sports team is mentioned, the system causes the video cassette recorder to turn on and tape a specified amount of the broadcast signal. When the consumer arrives home from work, the video cassette will have recorded snippets of broadcast signals containing information related to his favorite sports team.

The foregoing and other features, aspects and advantages of the present invention will become more apparent from the following detailed description of the present invention when taken in conjunction with the accompanying drawings.

DETAILED DESCRIPTION OF THE DRAWINGS

Figure 1:
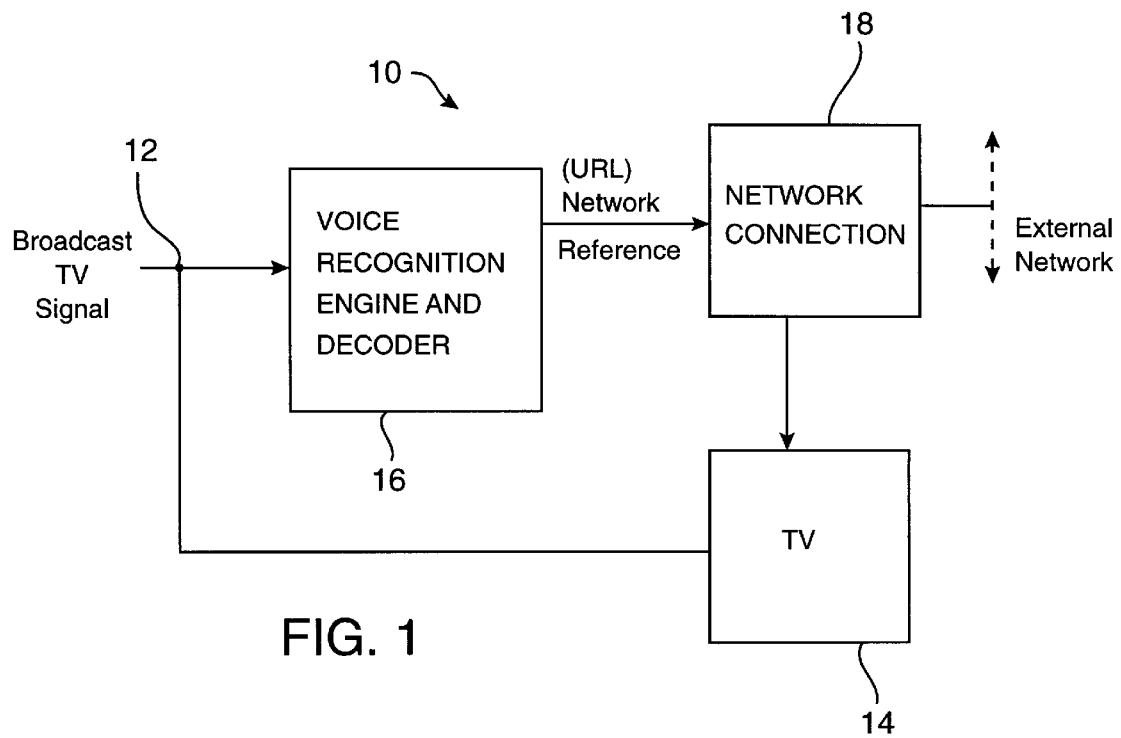
FIG. 1 is a block diagram of a broadcast keyword listening device constructed in accordance with an embodiment of the present invention.

FIG. 1 is a block diagram of the broadcast keyword listening device 10 constructed in accordance with an embodiment of the present invention. Some type of broadcast signal, such as a broadcast television signal or a cable signal, is carried on a cable 12 to a voice recognition engine and decoder 16. As will be described with respect to the different embodiments, this voice recognition engine and decoder 16 may be resident in a personal computer that is separate from a television, or may form part of a computer that is integrated into a television set or display.

The broadcast TV signal is also provided directly to a television 14 for display to a user. The voice recognition engine and decoder 16 generally decodes spoken references to a subject. In the exemplary embodiment, these spoken references relate to a network, such as the Internet. From the decoded spoken network references, the voice recognition engine and decoder 16 will generate a universal resource locator that provides the user of the television simple access to relevant Internet resources based upon the broadcast television content. The universal resource locator is provided via a network connection 18 to the Internet, this network connection 18 also providing its output to the television 14.

Figure 2:
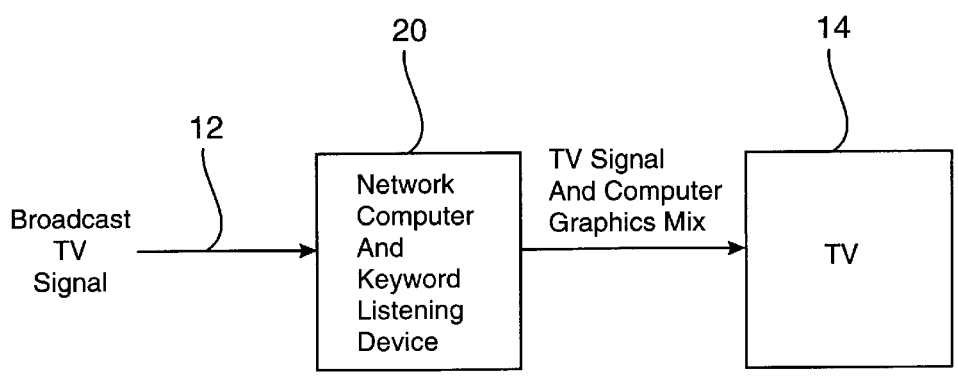
FIG. 2 is a block diagram depicting an embodiment of the present invention in which the processing of the broadcast audio signal is performed separately from the television.
Figure 4:
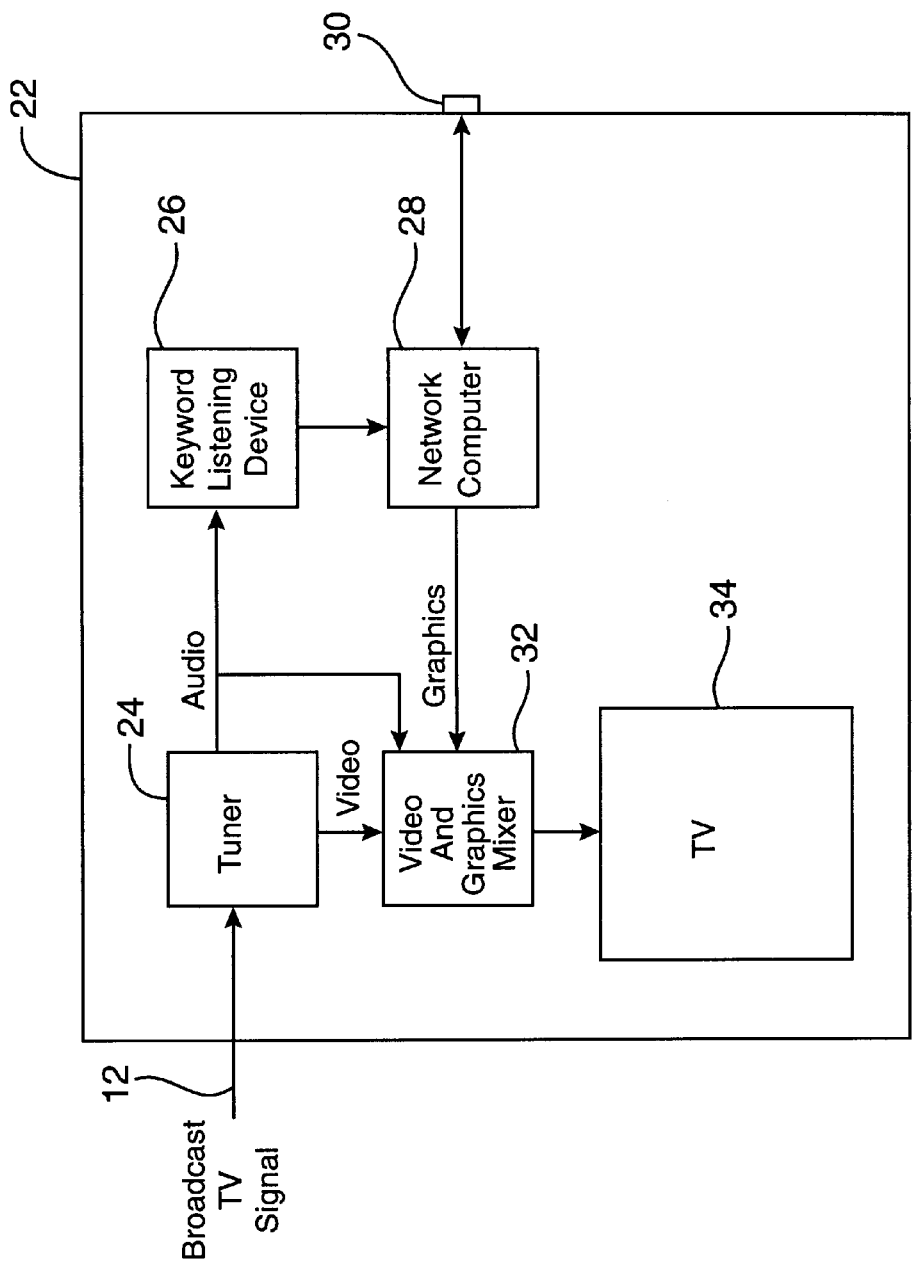
FIG. 4 is another embodiment of the present invention in which the processing of the broadcast audio signal is performed in an integrated television.

Two separate embodiments are depicted in FIGS. 2 and 4. In FIG. 2, the voice recognition engine and decoder is resident within a computer 20 that is separate from the television 14. By contrast, in FIG. 4, the television and computer 28 form an integrated unit.

In the embodiment of FIG. 2, the broadcast TV signal is provided on the cable 12 to a separate computer 20, such as a conventional personal computer. This personal computer 20 has a connection to the Internet or other external network, such as that shown in FIG. 1. It also contains the voice recognition engine and decoder as part of the keyword listening device. The television 14 is a standard television that is connected to the network computer 20 to receive the broadcast television signal. Computer graphics may also be mixed into the broadcast signal by the computer 20.

Figure 3:
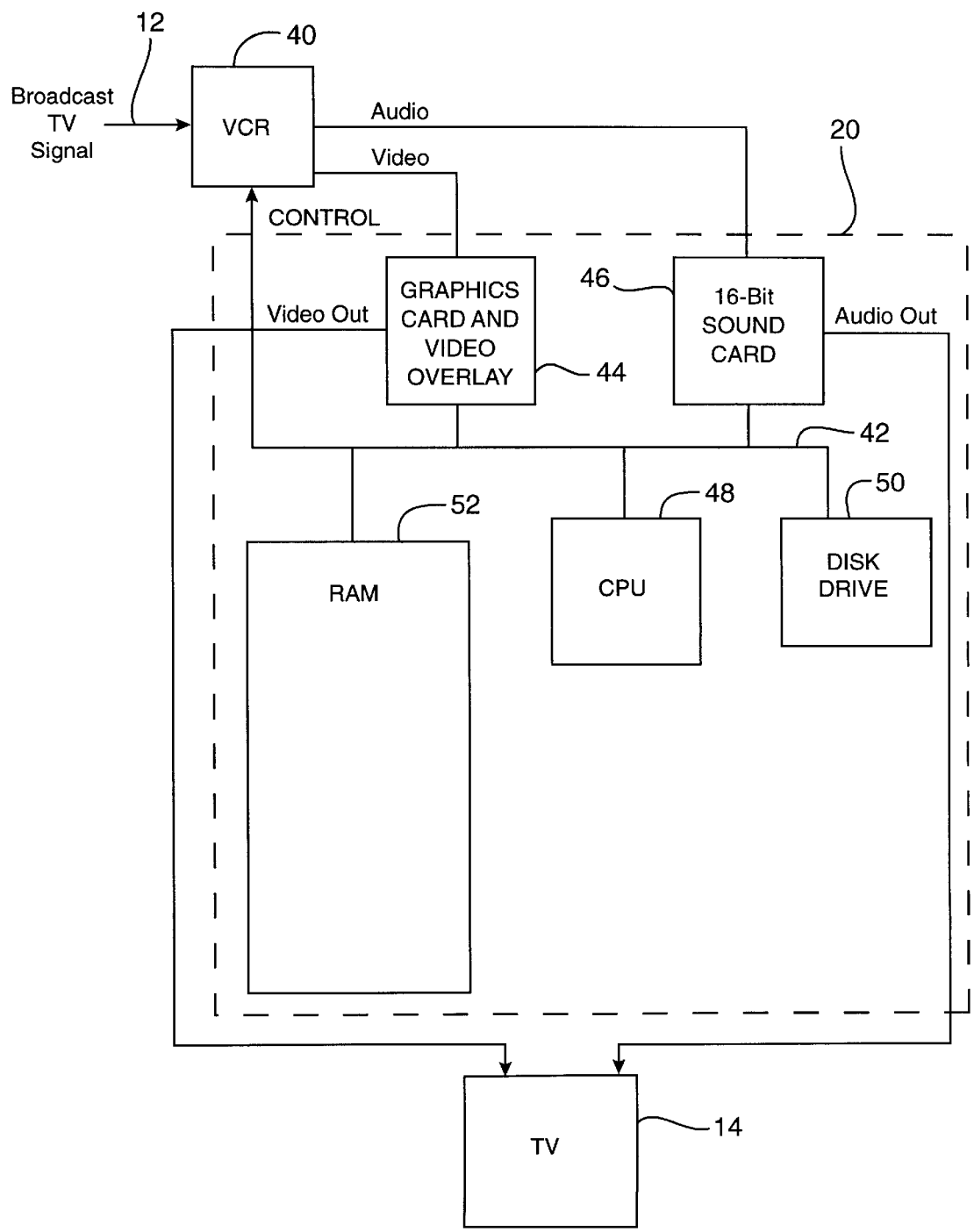
FIG. 3 shows in more detail the arrangement of FIG. 2 in accordance with an embodiment of the present invention.

A more detailed depiction of the embodiment of FIG. 2 is depicted in FIG. 3, which also includes a video cassette recorder (VCR) 40 that operates as a tuner for the system. The broadcast television signal is provided to the VCR 40 over cable 12. The VCR 40 separates the audio and video signals of the broadcast TV signal. The audio and video signals are then provided to the computer 20.

The computer 20, as shown in the exemplary embodiment of FIG. 3, contains a graphics card 44 that receives the video signal from the VCR 40. The graphics card 44 may be of conventional construction and may provide a video overlay. The output of the graphics card is a video signal that forms the input video signal to the television 14.

The audio portion of the broadcast TV signal from the VCR 40 is received by a sound card 46, such as a 16-bit sound card. The audio signal is generated as an output signal to the television set 14 from the sound card 46 of the computer 20.

The graphics card 44 and the sound card 46 are internally connected within the computer 20 via a bus 42 to a central processing unit (CPU) 48. The hard disk drive 50 may be coupled with the bus 42 to provide storage for, among other things, the audio signal.

Also coupled to the bus 42 is a random access memory (RAM) 52 that stores the voice recognition driver in this embodiment. In other embodiments, the voice recognition driver is stored in other types of memory, such as a read only memory. A conventional voice recognition driver, such as the Microsoft Speech Recognition driver or other commercially available driver that provides speech-to-text and text-to-speech capability, may be used in the present invention.

The RAM 52 contains the program to form the method of the present invention, such as that shown in the exemplary embodiment of FIG. 5, and will be described later. A list of active listening keywords is also stored in the RAM 52, and may be set by the consumer or stored by the manufacturer. The keywords are essentially phonically stored text. A list of keywords may be, for example, "HTTP", "WWW", "WORLD-WIDE-WEB" and "FTP". These keywords all relate to the Internet or world-wide-web and when included in a broadcast signal, would indicate that information containing a web site address may shortly follow the keyword. Since only a limited number of keywords need to be recognized, they may be stored in a fast RAM 52. Limiting the number of keywords reduces the computational complexity, allowing for less powerful CPUs to be used in the present invention. Also, storing the keywords in RAM 52 provides faster access to the keywords.

In certain embodiments, a conventional audio compression chip is used to provide compression and decompression of the audio signal that is being recorded in the circular audio buffer. This reduces the memory requirement for implementing the circular audio buffer and does not substantially compromise the operation of the voice recognition driver.

Figure 5:
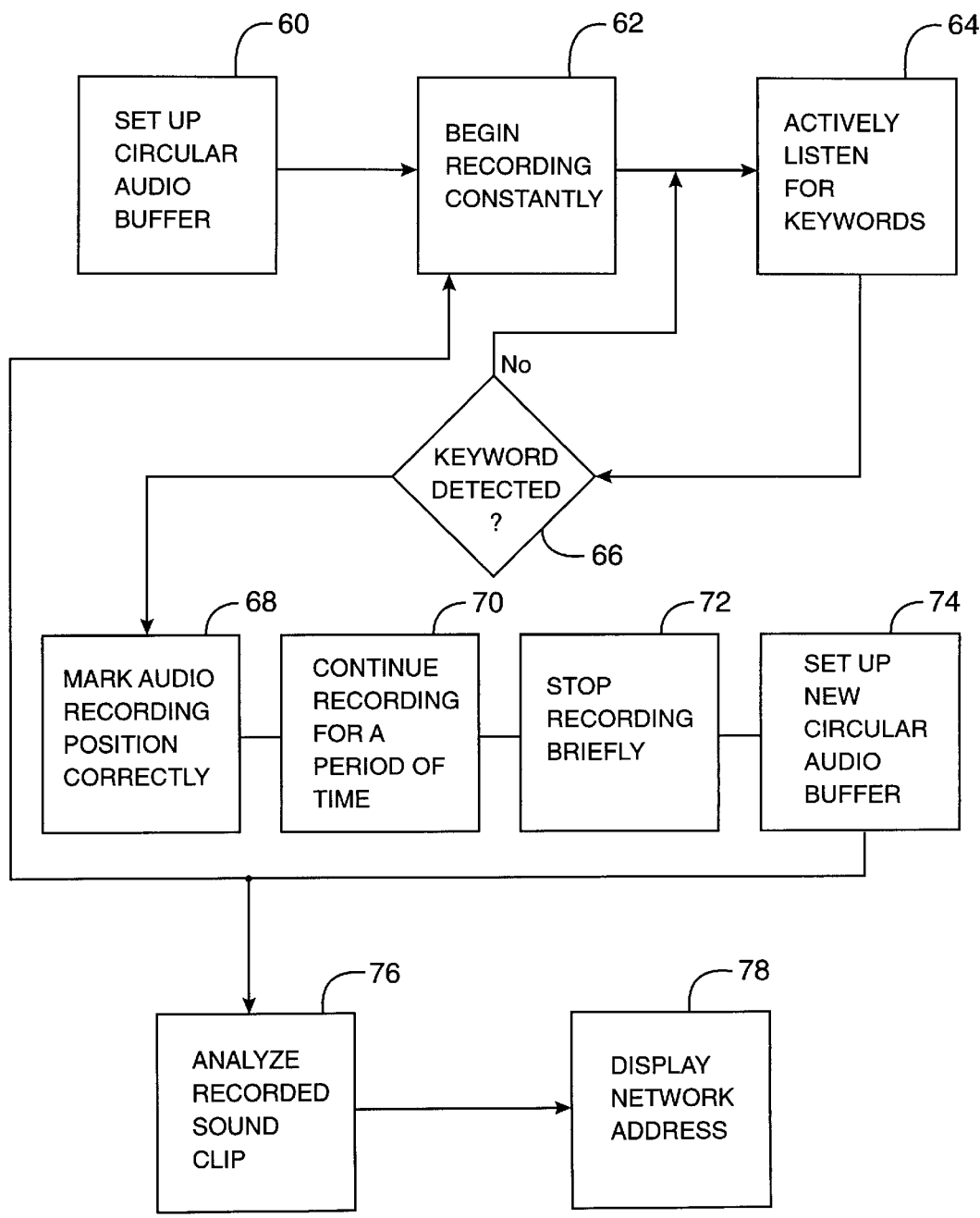
FIG. 5 is a flowchart of a method of detecting keywords and performing a control function in accordance with an embodiment of the present invention.

Referring to FIG. 5, in operation, the personal computer 20 first sets up the circular audio buffer that cyclically records the incoming audio signal. The circular audio buffer may be set up in RAM 52, for example. In step 62, the audio signal is constantly recorded in the circular audio buffer in a cyclical manner (i.e., a loop recording). In step 64, the keyword listening device actively "listens" for one or more of the words in the small set of keywords stored in the RAM 52. In step 66, it is determined whether a keyword has been detected in the audio signal by the voice recognition driver. If none of the keywords has been detected, then the program loops back to step 64 to actively listen for keywords.

Upon the detection of a keyword, the keyword listening device marks the audio recording position correctly to note where the keyword was detected (step 68). In step 70, the recording is then continued for a specified period of time after the detection of the keyword. At this point, due to the circular audio buffer, the broadcast audio signal has been recorded for a period of time both before and after the keyword was detected. This increases the probability that the useful information accompanying the keyword will be recorded for analysis.

The recording is stopped briefly in step 72, and a new circular audio buffer is set up in step 74. The process loops back to continue searching for keywords. The process also continues with the recorded sound clip, in step 76. The recorded sound clip is analyzed, using the voice recognition driver, to determine whether there is any useful information. Assuming that the information is useful, such as containing a complete external network address (e.g., http:\\www.samsung.com), the computer 20 creates the external network address and displays it to the user in step 78. This display may be on the computer, but in certain advantageous embodiments, the displaying is performed on the TV 14. With this external network address displayed, the user is provided with the option of simply selecting the address and establishing a connection via the personal computer 20 over the external network to the node at the external network address. The user may control the computer 20, and the display on the TV 14, through an input device (e.g., keyboard or mouse) not shown, to thereby cause the network computer 20 to connect to the external network node at the specified internet address.

The software for performing the method according to the present invention may be readily programmed by one of ordinary skill in the art.

By providing a control signal to the VCR 40, the present invention may also be used to record portions of the broadcast TV signal in response to the recognition of certain specified keywords. This is useful for consumers interested in recording portions of broadcasts related to specifed topics, such as news items related to a certain subject, sports news regarding a favorite team, etc. In operation, upon recognition of one of the keywords entered by the consumer into the RAM 52, the CPU 48 will send a control signal to the VCR 40 to cause it to start recording for a specified period of time, for example, 30 minutes. Upon arriving home, the consumer can then watch the recorded broadcasts that contain the broadcast content in which the consumer is most interested.

As discussed earlier, the personal computer 20 may also be integrated into the television to form an integrated unit. An embodiment of such an arrangement is depicted in FIG. 4, in which an integrated system 22 contains a tuner 24 that separates the audio and video signals of the broadcast TV signal received from the cable 12. The audio signal is provided to a listening device 26 that contains a voice recognition engine and decoder such as that described with respect to FIG. 3. A network computer 28 is coupled to the listening device 26 to receive the audio signal from this device 26. The audio signal is also provided through a video and graphics mixer 32 which receives graphics from the network computer 28. The video and audio signals are then provided from the video and graphics mixer 32 to conventional television components 34. The network portion of the computer 28 is connected through a telephone jack 30, or any other type of suitable network interface, to an external network. In operation, the embodiment of FIG. 4 is the same as that described in FIG. 3.

The embodiments of the keyword listening device system in accordance with the present invention provide a consumer with a great deal of interactivity and functionality without requiring any capital investment by vendors such as broadcasters, advertisers and cable companies. Also, the present invention takes advantage of the greater amount of processing power that is becoming more prevalent in consumer-level devices, such as in set-top boxes or digital satellite systems. Normally, this processing power is not fully utilized and the processor sits idle. Greater use of this valuable resource by the keyword listening device makes the ultimate consumer device more versatile.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An arrangement comprising:
   a memory containing stored sound representations;
   an audio signal monitoring device that monitors a broadcast audio signal for the presence of the stored sound representations in the broadcast audio signal;
   a processor responsive to detection of the stored sound representations in the broadcast audio signal by the audio signal monitoring device to perform a control function;
   said processor including a means for generating a universal resource locator as a result of an analysis of the broadcast audio signal.

2. The arrangement of claim 1, further including cyclically recording the broadcast audio signal, and wherein the control function includes continuing recording the broadcast audio signal for a period of time and analyzing the recorded broadcast audio signal.

3. The arrangement of claim 1, further comprising a conventional broadcast signal recorder that is responsive to the analyzed recorded broadcast audio signal to record a broadcast signal.

4. The arrangement of claim 1, further comprising a port to an external network and means for establishing a connection over the work to an external network node at an address specified by the universal resource locator.

5. The arrangement of claim 4, further comprising a user display.

6. The arrangement of claim 5, wherein the user display is a television.

7. The arrangement of claim 2, further comprising a conventional and independent broadcast signal recorder that is responsive to the analyzed recorded broadcast audio signal to record a broadcast signal.

8. The arrangement of claim 7, wherein the broadcast signal recorder is a video cassette recorder.

9. The arrangement of claim 1, wherein the memory is user writable with the sound representations to be stored in the memory.

10. The arrangement of claim 9, wherein the sound representations to be stored are a vast array of user alterable specific words.

11. The arrangement of claim 10, wherein the audio signal monitoring device includes a speech recognition driver.

12. A system comprising:
    a display receiving a video broadcast signal and an audio broadcast signal;
    a sound recorder that cyclically records the audio broadcast signal for a first period of time, and is responsive to a control signal to continue recording of the audio broadcast signal for a second period of time in addition to the first period of time to create a sound clip of the audio broadcast signal that has a length equal to the first period of time plus the second period of time;
    a keyword listening device that monitors the audio broadcast signal and generates the control signal in response to detection of a keyword in the audio broadcast signal;
    a processor that analyzes the sound clip and controls an action by the system as a function of the analyzed sound clip; and
    a network port for connecting the system to an external network.

13. The system of claim 12, wherein said network port and the processor create an address for selective connection of the system over the external network to a node of the external network.

14. The system of claim 13, wherein the system comprises a means for informing the user via the display of the selective connection, and a user input device for selecting connection of the system to the node of the external network.

15. The system of claim 12, further comprising a video and audio broadcast signal recorder which is responsive to the processor to record a specified video and audio broadcast signal.

16. The system of claim 15, wherein the video and audio broadcast signal recorder is a video cassette recorder.

17. The system of claim 12, wherein the display is a television.

18. The system of claim 12, further comprising a memory that stores the keywords.

19. A method of responding to a broadcast audio signal, comprising the steps of:

receiving an audio signal;

cyclically recording a sound clip loop of the audio signal;

monitoring for the presence of keywords in the audio signal;

recording the audio signal for a period of time upon detection of a keyword in the audio signal to generate an addition to the sound clip loop, the sound clip loop and the addition forming a sound clip;

analyzing the sound clip;

performing a control function in dependence upon the analyzed sound clip; and forming an external network address during said control function.

20. The method of claim 19, displaying said external network address to a user.

21. The method of claim 19, wherein the broadcast audio signal is a component of a broadcast video and audio signal, the control function comprising the step of recording the broadcast video and audio signal in dependence upon the analyzed sound clip.

* * * * *